United States Patent
Nakao et al.

(10) Patent No.: US 12,040,627 B2
(45) Date of Patent: Jul. 16, 2024

(54) NON-CONTACT POWER FEEDING DEVICE

(71) Applicant: OMRON Corporation, Kyoto (JP)

(72) Inventors: Goro Nakao, Inazawa (JP); Toshiyuki Zaitsu, Yokohama (JP)

(73) Assignee: OMRON Corporation, Kyoto (JP)

( * ) Notice: Subject to any disclaimer, the term of this patent is extended or adjusted under 35 U.S.C. 154(b) by 380 days.

(21) Appl. No.: 17/431,551

(22) PCT Filed: Mar. 4, 2020

(86) PCT No.: PCT/JP2020/009254
§ 371 (c)(1),
(2) Date: Aug. 17, 2021

(87) PCT Pub. No.: WO2020/195654
PCT Pub. Date: Oct. 1, 2020

(65) Prior Publication Data
US 2022/0140655 A1 May 5, 2022

(30) Foreign Application Priority Data

Mar. 22, 2019 (JP) .................................. 2019-055616

(51) Int. Cl.
*H02J 50/12* (2016.01)
*H02J 50/40* (2016.01)

(52) U.S. Cl.
CPC ............ *H02J 50/12* (2016.02); *H02J 50/402* (2020.01)

(58) Field of Classification Search
CPC .................................................... H02J 50/402
(Continued)

(56) References Cited

U.S. PATENT DOCUMENTS

2010/0244582 A1 9/2010 Yoshikawa
2011/0304216 A1* 12/2011 Baarman ............... H02J 50/402
307/104

(Continued)

FOREIGN PATENT DOCUMENTS

JP 2010-239848 A 10/2010
JP 2013-536664 A 9/2013
(Continued)

OTHER PUBLICATIONS

Japanese Office Action issued on Feb. 14, 2023 in a counterpart Japanese patent application.
(Continued)

*Primary Examiner* — Edward Tso
*Assistant Examiner* — Ahmed H Omar
(74) *Attorney, Agent, or Firm* — METROLEX IP LAW GROUP, PLLC (57) ABSTRACT

A power receiver device of a non-contact power feeding device includes a plurality of resonance circuits that receive power from a power transmitter device, a voltage detection circuit that detects an output voltage from the plurality of resonance circuits, and a control circuit. Receiver coils of the plurality of resonance circuits are arranged so as to be electromagnetically coupled to each other. At least one of resonance circuits includes a variable capacitance circuit that is connected to the receiver coil of the resonance circuit and is regulatable in capacitance. The control circuit regulates the capacitance of the variable capacitance circuit in accordance with the output voltage.

2 Claims, 5 Drawing Sheets

(58) Field of Classification Search
USPC .......................................................... 320/108
See application file for complete search history.

(56) References Cited

U.S. PATENT DOCUMENTS

| | | |
|---|---|---|
| 2015/0348692 A1 | 12/2015 | Ngahu |
| 2016/0254692 A1* | 9/2016 | Shcherbatko ......... H02J 50/402 |
| | | 307/104 |
| 2020/0014244 A1 | 1/2020 | Nakao et al. |
| 2021/0336487 A1* | 10/2021 | Kimura ................... H02J 50/90 |

FOREIGN PATENT DOCUMENTS

| | | |
|---|---|---|
| JP | 2014-160702 A | 9/2014 |
| JP | 2018-148640 A | 9/2018 |
| WO | 2010/137495 A1 | 12/2010 |

OTHER PUBLICATIONS

English translation of the International Search Report ("ISR") of PCT/JP2020/009254 mailed on May 12, 2020.
Written Opinion("WO") of PCT/JP2020/009254 mailed on May 12, 2020.
Japanese Office Action issued on Aug. 15, 2023 in a counterpart Japanese patent application No. 2019-055616.

* cited by examiner

NON-CONTACT POWER FEEDING DEVICE

TECHNICAL FIELD

The disclosure relates to a non-contact power feeding device.

BACKGROUND ART

Research has been conducted on a so-called non-contact power feeding (also called wireless power transfer) technology of transmitting power across space without using metal contacts or the like.

In a power feeding device (hereinafter, simply referred to as a non-contact power feeding device) using the non-contact power feeding technology, a primary-side (power transmitter-side) coil (hereinafter, referred to as a transmitter coil or a primary coil) and a secondary-side (power receiver-side) coil (hereinafter, referred to as a receiver coil or a secondary coil) are electromagnetically coupled to allow power to be transmitted from a power transmitter-side device to a power receiver-side device via the two coils.

In such a non-contact power feeding technology, a positional relationship between the transmitter coil and the receiver coil may change. When the positional relationship between the transmitter coil and the receiver coil changes, a degree of coupling between the transmitter coil and the receiver coil changes accordingly. When the degree of coupling changes, a resonance frequency of a power receiver-side resonance circuit including the receiver coil changes accordingly, and the change in the degree of coupling affects power transmission efficiency. Given these circumstances, disclosed is a technology for suppressing a decrease in energy transmission efficiency even when the degree of coupling between the transmitter coil and the receiver coil dynamically changes (see, for example, Patent Document 1). In this technology, a power receiver-side device includes a resonance circuit including a receiver coil that receives power from a power transmitter-side device and a variable capacitance circuit that is connected in parallel to the receiver coil and is adjustable in capacitance, and a voltage detection circuit that detects an output voltage from the resonance circuit, and the power receiver-side device regulates the capacitance of the variable capacitance circuit in accordance with the output voltage.

PRIOR ART DOCUMENT

Patent Document

Patent Document 1: Japanese Unexamined Patent Publication No. 2018-148640

SUMMARY

Some applications of such a non-contact power feeding device may, however, require the resonance circuit to output a high voltage, for example. When the output voltage increases, a voltage across terminals of a resonance capacitor or the receiver coil included in the resonance circuit excessively increases, and as a result, the voltage across the terminals may exceed a withstand voltage of a switching element used to change the capacitance of the variable capacitance circuit in the above-described technology, thereby making it difficult to apply the above-described technology.

It is therefore a non-contact power feeding device according to one or more embodiments is disclosed that may be capable of making a voltage across terminals of a variable capacitance circuit included in a power receiver-side resonance circuit lower and suppressing a decrease in energy transmission efficiency even when a degree of coupling between a transmitter coil and a receiver coil dynamically changes.

Provided according to one or more embodiments is a non-contact power feeding device including a power transmitter device and a power receiver device to which the power transmitter device transmits power in a non-contact manner. In the non-contact power feeding device, the power transmitter device includes a transmitter coil configured to supply power to the power receiver device, and a power supply circuit configured to supply AC power to the transmitter coil. The power receiver device includes a plurality of resonance circuits each including a receiver coil configured to receive power from the transmitter coil of the power transmitter device, a voltage detection circuit configured to detect an output voltage from the plurality of resonance circuits, and a control circuit. The receiver coils of the plurality of resonance circuits are arranged so as to be electromagnetically coupled to each other. At least one of the plurality of resonance circuits includes a variable capacitance circuit that is connected to the receiver coil of the least one of the plurality of resonance circuits and is regulatable in capacitance, the least one of the plurality of resonance circuits being configured to resonate at a frequency determined based on inductance of the receiver coil of the least one of the plurality of resonance circuits, capacitance of the variable capacitance circuit, and capacitance of another resonance circuit among the plurality of resonance circuits. The control circuit is configured to regulate the capacitance of the variable capacitance circuit of the at least one of the plurality of resonance circuits in accordance with the output voltage.

Such a structure may allow the non-contact power feeding device according to one or more embodiments to make a voltage across terminals of the resonance capacitor included in the power receiver-side resonance circuit lower and to suppress a decrease in energy transmission efficiency even when a degree of coupling between the transmitter coil and the receiver coil dynamically changes.

In the non-contact power feeding device, the receiver coils of the plurality of resonance circuits are wound around a single core.

This allows the power receiver device of the non-contact power feeding device to efficiently take power received by each resonance circuit via one resonance circuit or a load coil provided so as to be electromagnetically coupled to each resonance circuit.

The power receiver device may further include a load coil disposed so as to be electromagnetically coupled to each of the receiver coils of the plurality of resonance circuits and configured to output power received from the power transmitter device by each of the plurality of resonance circuits, the receiver coils of the plurality of resonance circuits be wound concentrically around the single core, and the load coil be wound around the core so as to be located remote from the transmitter coil relative to each of the receiver coils of the plurality of resonance circuits when the power transmitter device and the power receiver device are arranged to enable power transmission.

The above described configuration may allow the power receiver device of the non-contact power feeding device to efficiently take the power received by each resonance circuit via the load coil and to bring each receiver coil closer to the transmitter coil than the load coil so as to make the degree of coupling between the transmitter coil and each receiver coil higher than the degree of coupling between the transmitter coil and the load coil, thereby preventing the power transmission efficiency from decreasing due to the presence of the load coil.

Further, in the non-contact power feeding device, the receiver coil of the at least one of the plurality of resonance circuits of the power receiver device having the variable capacitance circuit may be smaller in inductance than the receiver coil of any of the plurality of resonance circuits having no variable capacitance circuit.

The above described configuration may allow the variable capacitance circuit to be larger in capacitance than the resonance capacitor of the resonance circuit having no variable capacitance circuit in order to allow each resonance circuit to resonate with the AC power supplied to the transmitter coil, thereby allowing the power receiver device of the non-contact power feeding device to make the withstand voltage required for the variable capacitance circuit lower.

DETAILED DESCRIPTION

Hereinafter, a non-contact power feeding device according to one or more embodiments will be described with reference to the drawings. In a non-contact power feeding device, a power receiver-side device (hereinafter, simply referred to as a power receiver device) includes a plurality of resonance circuits that resonate with a current flowing through a transmitter coil of a power transmitter-side device (hereinafter, simply referred to as a power transmitter device). Each of the resonance circuits of the power receiver device includes a receiver coil and a variable capacitance circuit that is regulatable in capacitance. The receiver coils of the resonance circuits are arranged so as to be electromagnetically coupled to each other, and the power receiver device outputs, from one of the resonance circuits, power received by each resonance circuit. The above described arrangement may cause, as compared with a structure where the power receiver device includes one resonance circuit and one receiver coil, the non-contact power feeding device to lower a voltage across terminals of the variable capacitance circuit of each of the resonance circuits by making inductance of the receiver coil of the resonance circuit lower and making the capacitance of the variable capacitance circuit higher. Furthermore, the power receiver device adjusts the capacitance of the variable capacitance circuit of each of the resonance circuits in accordance with an output voltage to suppress a decrease in power transmission efficiency even when a degree of coupling between the transmitter coil and the receiver coil of each of the resonance circuits dynamically changes.

Figure 1:
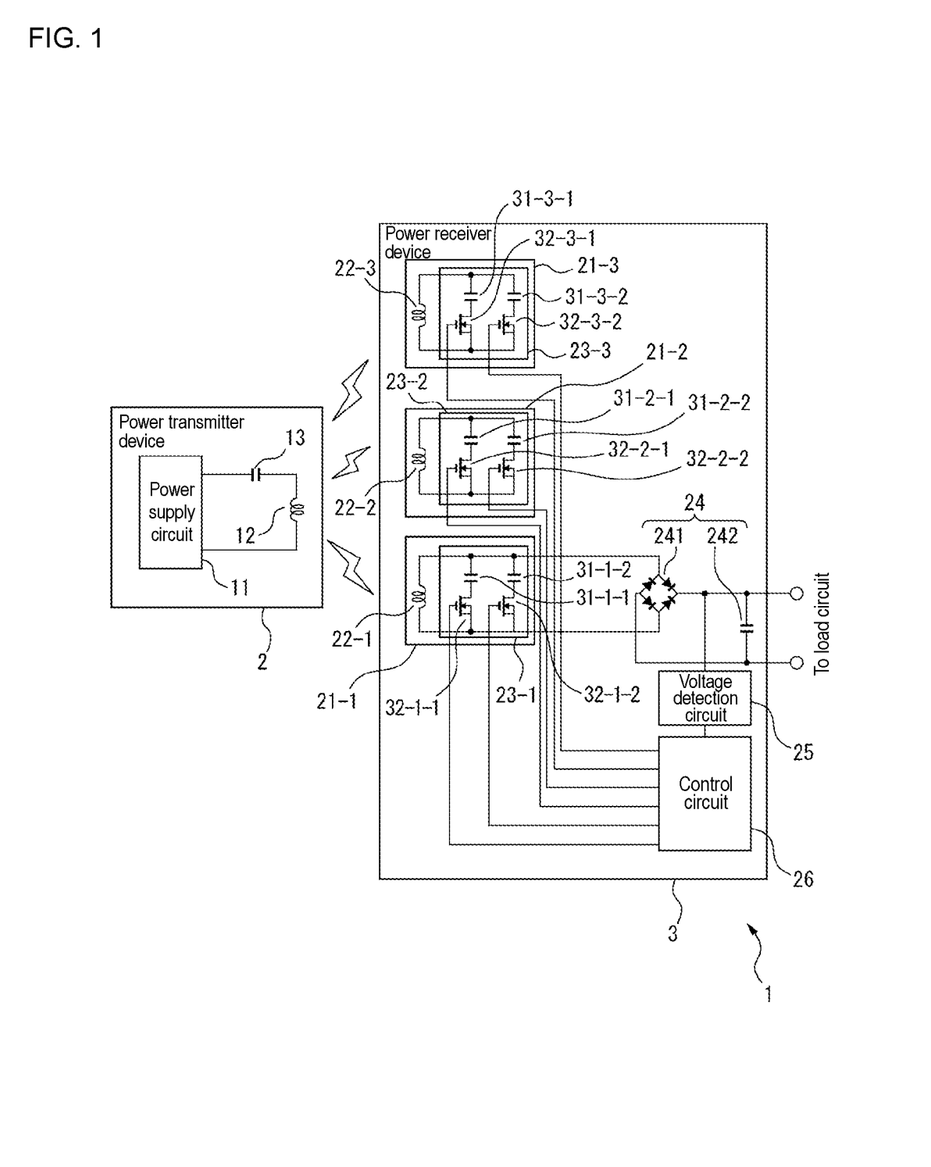
FIG. 1 is a schematic structure diagram illustrating a non-contact power feeding device according to one or more embodiments.

FIG. 1 is a schematic structure diagram of the non-contact power feeding device according to one or more embodiments. As shown in FIG. 1, the non-contact power feeding device 1 includes a power transmitter device 2 and a power receiver device 3 to which the power transmitter device 2 transmits power across space in a non-contact manner. The power transmitter device 2 includes a power supply circuit 11, a transmitter coil 12, and a capacitor 13. On the other hand, the power receiver device 3 includes n resonance circuits 21-1 to 21-$n$ (where n is an integer greater than or equal to 2, and in the example shown in FIG. 1, n is equal to 3), a rectifying and smoothing circuit 24, a voltage detection circuit 25, and a control circuit 26. According to one or more embodiments, the non-contact power feeding device 1 is of a type in which a receiver coil and a resonance capacitor included in a variable capacitance circuit resonate in parallel on a secondary side without using resonance on a primary side (NP type). Note that the non-contact power feeding device 1 may be of a type in which the receiver coil and the resonance capacitor resonate in series on the secondary side without using resonance on the primary side (NS type).

First, a description will be given of the power transmitter device 2.

The power supply circuit 11 supplies AC power to the transmitter coil 12. It is therefore required that the power supply circuit 11 include, for example, a DC power supply that supplies DC power, an inverter circuit that converts the DC power supplied from the DC power supply to AC power and supplies the AC power to the transmitter coil 12, and a control circuit that controls the inverter circuit. The inverter circuit may be a full-bridge inverter having four switching elements (for example, MOSFETs) connected in a full-bridge configuration, or may be a half-bridge inverter having two switching elements connected in a half-bridge configuration. The control circuit controls switching of each switching element of the inverter circuit to an on or off state to make a frequency of the AC power supplied to the transmitter coil 12 equal to a predetermined frequency (for example, a frequency at which each resonance circuit can resonate when the degree of coupling between the receiver coil of each resonance circuit of the power receiver device 3 and the transmitter coil 12 is a predetermined degree). The power supply circuit 11 may further include a DC-DC converter between the DC power supply and the inverter circuit.

The transmitter coil 12 is electromagnetically coupled to the receiver coil of each resonance circuit of the power receiver device 3 to transmit the AC power supplied from the power supply circuit 11 to the resonance circuits 21-1 to 21-n of the power receiver device 3 across space.

The capacitor 13 is connected in series to the transmitter coil 12 between the transmitter coil 12 and the inverter circuit of the power supply circuit 11. According to the embodiment, the capacitor 13 is provided to cut off DC power. It is therefore required that the capacitance of the capacitor 13 be set to prevent a resonance circuit made up of the transmitter coil 12 and the capacitor 13 from resonating with the AC power supplied to the transmitter coil 12, that is, to make the frequency of the AC power supplied to the transmitter coil 12 different from the resonance frequency of the resonance circuit. Note that when the power supply circuit 11 includes a full-bridge inverter, the capacitor 13 need not be provided.

Next, a description will be given of the power receiver device 3.

Each of the n resonance circuits 21-1 to 21-n includes a receiver coil 22-k and a variable capacitance circuit 23-k (where k is in a range of 1 to n). Furthermore, in each resonance circuit, the variable capacitance circuit 23-k includes two resonance capacitors 31k-1, 31k-2 and two switching elements 32k-1, 32k-2 that are connected in parallel to the receiver coil 22-k. The resonance capacitor 31k-1 and the switching element 32k-1 are connected in series. Likewise, the resonance capacitor 31k-2 and the switching element 32k-2 are connected in series. Note that, in each resonance circuit, the variable capacitance circuit 23-k may include at least three resonance capacitors connected in parallel to each other and switching elements each connected in series to a corresponding one of the at least three resonance capacitors. Alternatively, one of the plurality of resonance capacitors included in the variable capacitance circuit 23-k may be directly connected to the receiver coil with no switching element interposed between the resonance capacitor and the receiver coil.

In each resonance circuit, the switching elements 32-k-1, 32-k-2 may be n-channel MOSFETs, for example. The switching element 32-k-1 has a drain terminal connected to one end of the receiver coil 22-k via the resonance capacitor 31-k-1 and has a source terminal connected to the other end of the receiver coil 22-k. Likewise, the switching element 32-k-2 has a drain terminal connected to one end of the receiver coil 22-k via the resonance capacitor 31-k-2 and has a source terminal connected to the other end of the receiver coil 22-k. Further, the switching elements 32-k-1, 32-k-2 have their respective gate terminals connected to the control circuit 26.

The two switching elements 32-k-1, 32-k-2 of each resonance circuit are switched to the on or off state under the control of the control circuit 26. Of the two resonance capacitors 31-k-1, 31-k-2, a resonance capacitor connected in series to a switching element switched to the on state contributes to the resonance of the resonance circuit 21-k. That is, a resonance frequency $f_k$ of the resonance circuit 21-k is expressed by the following equation when the degree of coupling between the receiver coils of the resonance circuits can approximate to 1.

[Math. 1]

$$f_k = \frac{1}{2\pi\sqrt{C_{pvk}L_{kr2}}} \quad (1)$$

$$L_{kr2} = L_{k2}(1-k)(1+k)$$

$$C_{pvk} = \sum_{j=1}^{n}\left(\frac{L_{k2}}{L_{j2}}\left(\sum_{i=1}^{2}(s_{ji}C_{ji})\right)\right)$$

$$s_{ji} = \begin{cases} 1 & \text{ON} \\ 0 & \text{OFF} \end{cases}$$

Herein, $C_{pvk}$ denotes the capacitance of the resonance circuit 21-k. $C_{ji}$ (j is equal to 1, 2, or 3, and i is equal to 1 or 2) denotes the capacitance of each of the resonance capacitors 31-j-1, 31-j-2 of the variable capacitance circuit 23-j of each resonance circuit. Furthermore, $s_{ji}$ (j is equal to 1, 2, or 3, i is equal to 1 or 2) denotes a coefficient indicating whether each of the switching elements 32-j-1, 32-j-2 of the variable capacitance circuit 23-j of each resonance circuit is switched to the on or off state. When the switching element 32-j-1 is switched to the on state, $s_{j1}$ becomes equal to 1, and when the switching element 32-j-1 is switched to the off state, $s_{j1}$ becomes equal to 0. Likewise, when the switching element 32-j-2 is switched to the on state, $s_{j2}$ becomes equal to 1, and when the switching element 32-j-2 is switched to the off state, $s_{j2}$ becomes equal to 0. That is, $C_{pvk}$ denotes the sum of values each resulting from multiplying the sum of the capacitance of the resonance capacitor connected in series to the switching element switched to the on state among the two resonance capacitors 31-j-1, 31-j-2 of the variable capacitance circuit of each resonance circuit by the ratio of the inductance of the receiver coil 22-k of the resonance circuit 21-k to the inductance of the receiver coil 22-j of each resonance circuit. Note that, in each resonance circuit, the two resonance capacitors 31-j-1, 31-j-2 may be the same or different in capacitance. Furthermore, the two resonance capacitors 31-j-1, 31-j-2 may be the same or different in capacitance for each resonance circuit. $L_{k2}$ denotes the inductance of the receiver coil 22-k of the resonance circuit 21-k, and $L_{j2}$ denotes the inductance of the receiver coil of each resonance circuit. $L_{kr2}$ denotes the inductance of the receiver coil 22-k when the transmitter coil 12 is short-circuited, and k denotes the degree of coupling between the transmitter coil 12 and the receiver coil 22-k.

As is apparent from the equation (1), as the number of resonance capacitors contributing to resonance among the resonance capacitors 31-j-1, 31-j-2 included in the variable capacitance circuit of each resonance circuits increase, that is, as the number of switching elements switched to the on state increases, the capacitance in the resonance circuit 21-k increases, and the resonance frequency $f_k$ of the resonance circuit 21-k decreases accordingly. On the other hand, as the number of resonance capacitors that do not contribute to resonance among the resonance capacitors 31-j-1, 31-j-2 included in the variable capacitance circuit of each resonance circuit increases, that is, as the number of switching elements switched to the off state increases, the capacitance in the resonance circuit 21-k decreases, and the resonance frequency $f_k$ of the resonance circuit 21-k increases accordingly.

According to the embodiment, in the resonance circuit 21-1, the receiver coil 22-1 and the variable capacitance circuit 23-1 are connected in parallel. The resonance circuit 21-1 is connected to the rectifying and smoothing circuit 24. On the other hand, in the other resonance circuits 21-2 to 21-*n*, the receiver coil 22-*j* and the variable capacitance circuit 23-*j* (j is in a range of 2 to n) form a closed loop. An adjustment range of the inductance of the receiver coil 22-*k* and the capacitance of the variable capacitance circuit 23-*k* of each resonance circuit is set so as to allow, for example, products of the inductance and capacitance of the resonance circuits 21-1 to 21-*n* to equal to each other and allow each resonance circuit to resonate with the current flowing through the transmitter coil 12. For example, the receiver coils 22-1 to 22-*n* of the resonance circuits are set identical in inductance to each other, and the variable capacitance circuits 23-1 to 23-*n* of the resonance circuits are set identical in adjustment range of capacitance to each other.

Further, the receiver coils 22-*k* of the resonance circuits are arranged so as to be electromagnetically coupled to each other. Therefore, when the power transmitter device 2 and the power receiver device 3 are in a positional relationship where power transmission from the power transmitter device 2 to the power receiver device 3 is enabled, each of the receiver coils 22-1 to 22-*n* of the resonance circuits 21-1 to 21-*n* is electromagnetically coupled to the transmitter coil 12 to allow each resonance circuit to receive power from the transmitter coil 12. Furthermore, since the receiver coils 22-1 to 22-*n* of the resonance circuits 21-1 to 21-*n* are arranged so as to be electromagnetically coupled to each other, the resonance circuit 21-1 connected to the rectifying and smoothing circuit 24 further receives power from the other resonance circuits 21-2 to 21-*n*. Therefore, the resonance circuit 21-1 outputs, to the rectifying and smoothing circuit 24, the sum of power directly received from the power transmitter device 2 and power received from the power transmitter device 2 by the other resonance circuits 21-2 to 21-*n* and passed to the resonance circuit 21-1.

Note that the receiver coils 22-*k* of the resonance circuits and the transmitter coil 12 may be the same or different in number of turns. Further, the receiver coils 22-*k* of the resonance circuits may be the same or different in number of turns.

Figure 2A:
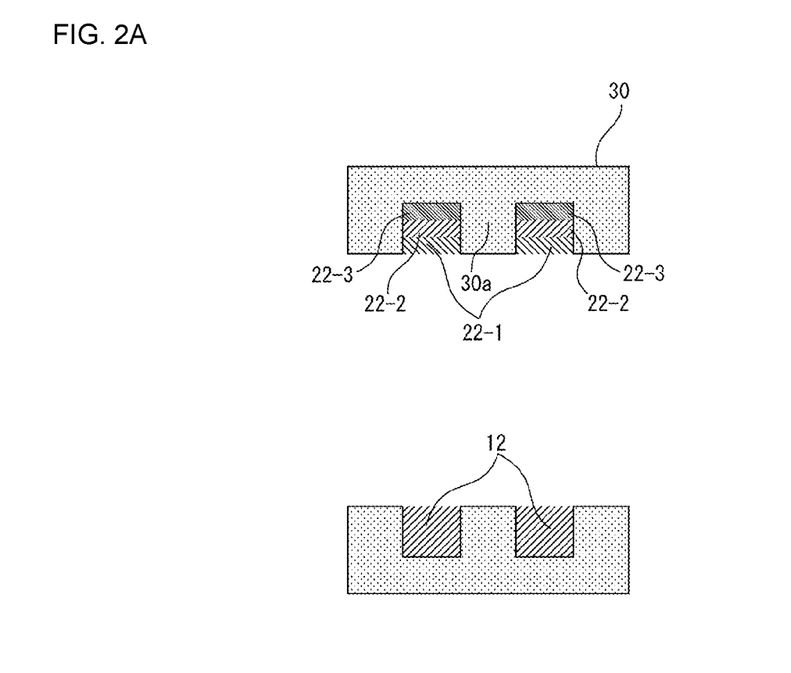
FIG. 2A is a schematic diagram illustrating a cross-sectional view of receiver coils included in resonance circuits of a power receiver device taken along a plane extending along center axes of the receiver coils, and showing an example of an arrangement of receiver coils.
Figure 2B:
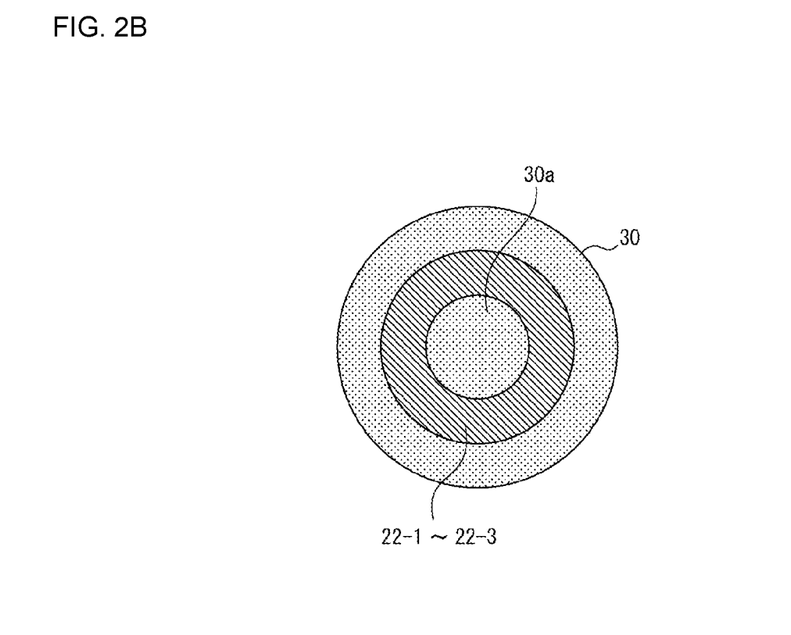
FIG. 2B is a schematic diagram illustrating a plan view of an example of an arrangement of receiver coils as viewed from a transmitter coil with power transmission between a power transmitter device and a power receiver device enabled.

FIG. 2A is a schematic cross-sectional view of each of the receiver coils 22-1 to 22-*n* (in this example, n is equal to 3) included in the resonance circuits 21-1 to 21-*n* of the power receiver device 3 taken along a plane extending along center axes of the receiver coils 22-1 to 22-*n*, showing an example of the arrangement of the receiver coils 22-1 to 22-*n*. FIG. 2B is a schematic plan view of the example of the arrangement of the receiver coils as viewed from the transmitter coil 12 with power transmission between the power transmitter device 2 and the power receiver device 3 enabled.

As shown in FIG. 2A, according to the embodiment, the receiver coils 22-1 to 22-3 of the resonance circuits are wound around a single core 30 so as to be electromagnetically coupled to each other. In particular, according to the embodiment, the receiver coils 22-1 to 22-3 are wound so as to be layered on a magnetic core 30*a* of the core 30. In the example shown in FIG. 2A, the receiver coils are layered in the order of the receiver coil 22-3, the receiver coil 22-2, and the receiver coil 22-1 from a side remote from the transmitter coil 12. Note that the receiver coils 22-1 to 22-3 may be layered in any order. This allows, when the transmitter coil 12 is placed to face the side of the core 30 around which the receiver coils 22-1 to 22-3 are wound, any of the receiver coils 22-1 to 22-3 to be electromagnetically coupled to the transmitter coil 12. Further, since the receiver coils 22-1 to 22-3 are wound around the single core 30, the degree of coupling between the receiver coils 22-1 to 22-3 can be made higher. This allows the resonance circuit 21-1 to receive the power from the power transmitter device 2 via the other resonance circuits 21-2 to 21-3 with high efficiency.

Figure 3A:
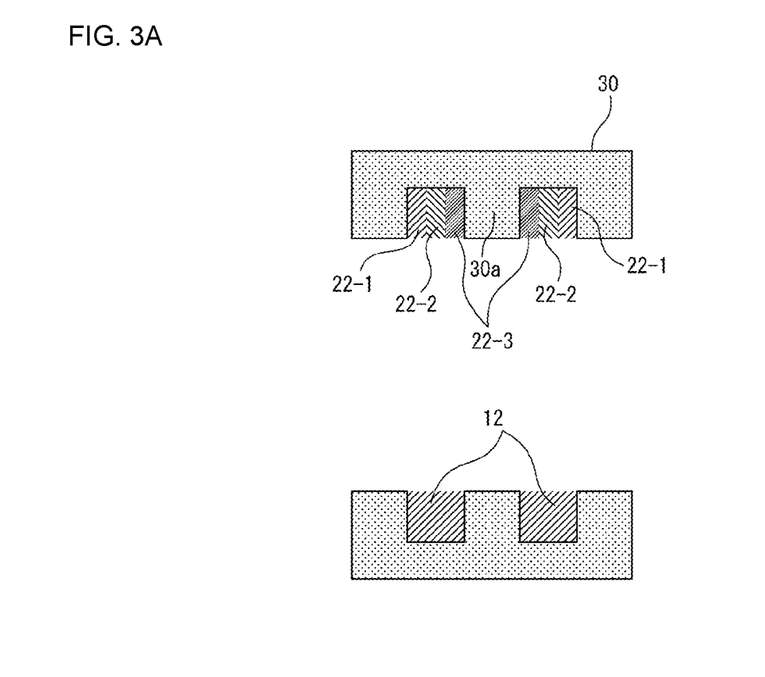
FIG. 3A is a schematic diagram illustrating a cross-sectional view of receiver coils included in resonance circuits of a power receiver device taken along a plane extending along the center axes of the receiver coils, showing another example of an arrangement of receiver coils.
Figure 3B:
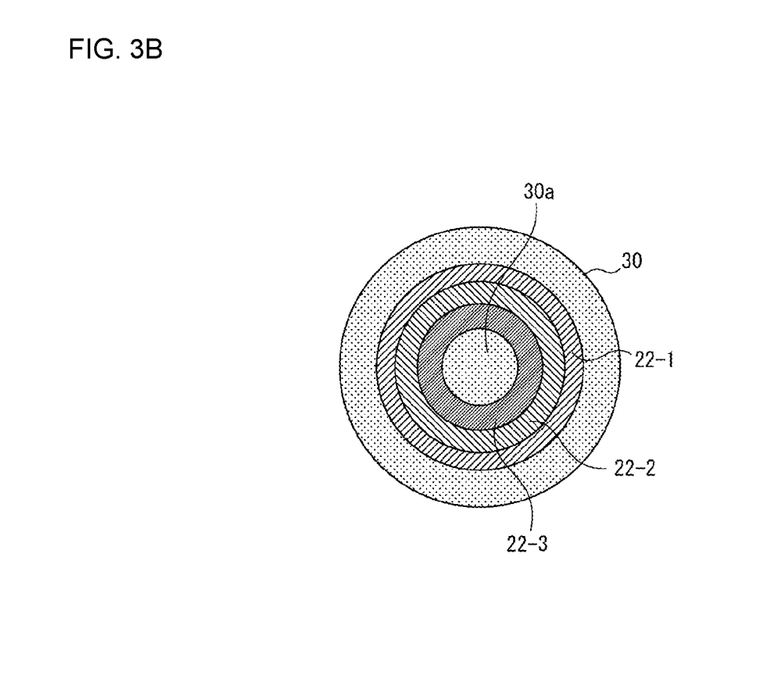
FIG. 3B is a schematic diagram illustrating a plan view of another example of an arrangement of receiver coils as viewed from a transmitter coil with power transmission between a power transmitter device and a power receiver device enabled.

FIG. 3A is a schematic cross-sectional view of each of the receiver coils 22-1 to 22-*n* (in this example, n is equal to 3) included in the resonance circuits 21-1 to 21-*n* of the power receiver device 3 taken along a plane extending along the center axes of the receiver coils 22-1 to 22-*n*, showing another example of the arrangement of the receiver coils 22-1 to 22-*n*. FIG. 3B is a schematic plan view of another example of the arrangement of the receiver coils as viewed from the transmitter coil 12 with power transmission between the power transmitter device 2 and the power receiver device 3 enabled.

Also, in this example, the receiver coils 22-1 to 22-3 of the resonance circuits are wound around the single core 30 as shown in FIG. 3A. In this example, however, the receiver coils 22-1 to 22-3 are wound concentrically around the magnetic core 30*a* of the core 30. In the example shown in FIG. 3A, the receiver coils are wound around the magnetic core 30*a* in the order of the receiver coil 22-3, the receiver coil 22-2, and the receiver coil 22-1 from the inner side. Note that the receiver coils 22-1 to 22-3 may be wound around the magnetic core 30*a* in any order. This example can make a difference in degree of coupling between each of the receiver coils 22-1 to 22-3 and the transmitter coil 12 smaller.

The rectifying and smoothing circuit 24 includes a full-wave rectifying circuit 241 including four bridge-connected diodes and a smoothing capacitor 242. The rectifying and smoothing circuit 24 rectifies and smooths the power output from the resonance circuit 21-1 to convert the power to DC power. Then, the rectifying and smoothing circuit 24 outputs the DC power to a load circuit.

The voltage detection circuit 25 measures the output voltage across both terminals of the full-wave rectifying circuit 241. The output voltage across both the terminals of the full-wave rectifying circuit 241 corresponds to the output voltage of the resonance circuit 21-1 on a one-to-one basis; therefore, detecting the output voltage across both the terminals of the full-wave rectifying circuit 241 is indirectly the same as detecting the output voltage of the resonance circuit 21-1. The voltage detection circuit 25 may be, for example, any of various known voltage detection circuits capable of detecting a DC voltage. Note that, according to the embodiment, it is only required that the voltage detection circuit 25 be capable of detecting whether the output voltage is higher than a threshold voltage at which each switching element of the variable capacitance circuits 23-1 to 23-*n* is switched to the on or off state, and thus any circuit having such a detection capability may be employed.

The control circuit 26 regulates the capacitance of each of the variable capacitance circuits 23-1 to 23-*n* of the resonance circuits 21-1 to 21-*n* in accordance with the voltage detection result from the voltage detection circuit 25.

As disclosed in Patent Document 1, as the frequency of the AC power supplied to the transmitter coil 12 becomes closer to the resonance frequency of the resonance circuits 21-1 to 21-*n* of the power receiver device 3, the output voltage from the resonance circuit 21-1 increases. Further, a non-contact power feeding device of an NP type is driven at a constant current near the resonance frequency, which causes the output voltage to greatly change in a manner that depends on load resistance of the load circuit.

On the other hand, when the frequency of the AC power supplied to the transmitter coil 12 becomes apart from the resonance frequency of the resonance circuits 21-1 to 21-*n* of the power receiver device 3, the non-contact power feeding device is driven at a constant voltage, and the output voltage becomes approximately constant even when the load resistance of the load circuit changes.

Therefore, for example, when a change in degree of coupling between the transmitter coil 12 and the receiver coils 22-1 to 22-n of the resonance circuits of the power receiver device 3 makes the resonance frequency of each resonance circuit closer to the frequency of the AC power supplied to the transmitter coil 12 to increase the output voltage of the resonance circuit 21-1, the control circuit 26 changes the resonance frequency of each resonance circuit. Accordingly, the control circuit 26 makes a difference between the frequency of the AC power supplied to the transmitter coil 12 and the resonance frequency on the power receiver side larger so as to allow the power receiver device 3 to be kept under the constant voltage driving.

Therefore, when the output voltage from the resonance circuit 21-1 increases, the control circuit 26 regulates the capacitance of each of the variable capacitance circuits 23-1 to 23-n of the resonance circuits 21-1 to 21-n so as to decrease the capacitance of any of the variable capacitance circuits 23-1 to 23-n. According to the embodiment, as the output voltage from the resonance circuit 21-1 increases, the control circuit 26 increases the number of switching elements to be switched to the off state among the switching elements 32-k-1, 32-k-2 of the variable capacitance circuit 23-k of the resonance circuit 21-k of interest. This increases, as expressed by the equation (1), the resonance frequency on the power receiver side. As a result, the control circuit 26 can make a difference between the frequency of the AC power supplied to the transmitter coil 12 and the resonance frequency on the power receiver side larger, thereby allowing the power receiver device 3 to be kept under the constant voltage driving. This also suppresses an increase in circulating current flowing through each resonance circuit, suppresses a decrease in power transmission efficiency, and prevents overvoltage from arising in the power receiver device 3.

Note that the control circuit 26 may regulate, in any order, the capacitance of the variable capacitance circuit 23-k of each resonance circuit in response to an increase in the output voltage from the resonance circuit 21-1. For example, the control circuit 26 first regulates the capacitance of the variable capacitance circuit 23-1 of the resonance circuit 21-1. Then, when the output voltage from the resonance circuit 21-1 further increases even when the capacitance of the variable capacitance circuit 23-1 has reached a lower limit within the adjustment range (that is, even when both the switching elements 32-1-1, 32-1-2 are switched to the off state), the control circuit 26 regulates the capacitance of the variable capacitance circuit 23-2 of the resonance circuit 21-2. Then, when the output voltage from the resonance circuit 21-1 further increases even when the capacitance of the variable capacitance circuit 23-2 has reached the lower limit within the adjustment range (that is, even when both the switching elements 32-2-1 and 32-2-2 are switched to the off state), the control circuit 26 regulates the capacitance of the variable capacitance circuit 21-3 of the resonance circuit 23-3.

On the other hand, when the output voltage from the resonance circuit 21-1 decreases, the control circuit 26 only needs to increase the capacitance of any of the variable capacitance circuits 23-1 to 23-n of the resonance circuits 21-1 to 21-n. That is, the control circuit 26 only needs to increase the number of switching elements to be switched to the on state among the switching elements 32-k-1 and 32-k-2 of the variable capacitance circuit 23-k of the resonance circuit 21-k of interest. Further, the control circuit 26 may regulate, in any order, the capacitance of the variable capacitance circuit of each resonance circuit in response to a decrease in the output voltage from the resonance circuit 21-1. For example, the control circuit 26 may regulate the capacitance of the variable capacitance circuit of each resonance circuit in the reverse of the order applied when the output voltage increases.

Further, the control circuit 26 may simultaneously regulate the capacitance of the variable capacitance circuits of the plurality of resonance circuits. For example, the control circuit 26 may switch any of the switching elements of the variable capacitance circuit of each resonance circuit to the off state every time the output voltage becomes greater than an upper limit threshold voltage. Conversely, the control circuit 26 may switch any of the switching elements of the variable capacitance circuit of each resonance circuit to the on state every time the output voltage becomes less than a lower limit threshold voltage.

Note that the control circuit 26 may be similar in structure to the control circuit of the power receiver device disclosed in Patent Document 1, for example. Alternatively, the control circuit 26 may include a memory that stores the on or off state of the switching elements of each variable capacitance circuit, and a circuit that controls the switching of the switching elements of each variable capacitance circuit to the on or off state. Then, every time the output voltage measured by the voltage detection circuit 25 becomes greater than the predetermined upper limit threshold voltage, the control circuit 26 consults to the memory to identify a switching element switched to the on state from the switching elements of each variable capacitance circuit and controls the switching of any switching element switched to the on state to the off state. Further, every time the output voltage measured by the voltage detection circuit 25 becomes less than the predetermined lower limit threshold voltage, the control circuit 26 only needs to consult the memory to identify a switching element switched to the off state from the switching elements of each variable capacitance circuit and control the switching of any switching element switched to the off state to the on state. Note that the upper limit threshold voltage may be, for example, an upper limit value of a drive voltage applied to the load circuit connected to the power receiver device 3. Further, the lower limit threshold voltage may be, for example, a lower limit value of the drive voltage applied to the load circuit connected to the power receiver device 3.

A description will be given below of a reduction in voltage across the terminals of the resonance capacitor included in each resonance circuit due to the presence of the plurality of resonance circuits in the power receiver device 3 according to the embodiment.

A voltage across terminals of a resonance capacitor of an RLC series resonance circuit, denoted by Vpp, is given by the following equation.

[Math. 2]

$$V_{pp} = 2\sqrt{2} \frac{I_{CS}}{2\pi f C_s} \qquad (2)$$

Herein, $I_{CS}$ denotes a value of an effective current flowing through the resonance capacitor, and Cs denotes the capacitance of the resonance capacitor. Further, f denotes a resonance frequency of the resonance circuit. As is apparent from the equation (2), the larger the capacitance Cs of the resonance capacitor, the smaller the voltage Vpp across the terminals of the resonance capacitor.

Further, as is apparent from the equation (1), when the resonance frequency f of the resonance circuit is made constant, the smaller the inductance L of the receiver coil, the larger the capacitance Cs of the resonance capacitor.

Further, the inductance L of the coil is proportional to the square of the number of turns N of the coil. Furthermore, in a structure where the power receiver device includes a plurality of resonance circuits, and receiver coils of the resonance circuits are electromagnetically coupled to each other as in the embodiment, as described in relation to the equation (1), resonance capacitors of resonance circuits other than a resonance circuit of interest among the plurality of resonance circuits are equivalent to a resonance capacitor of the resonance circuit of interest that is connected in parallel to the receiver coil of the resonance circuit of interest. Then, the capacitance of the resonance capacitor of each resonance circuit other than the resonance circuit of interest is obtained by multiplying the capacitance of the resonance capacitor of the resonance circuit of interest by a ratio between the square of the number of turns of the receiver coil of the resonance circuit of interest and the square of the number of turns of the receiver coil of the resonance circuit other than the resonance circuit of interest, that is, an inductance ratio. Therefore, when a structure where the power receiver device includes a single resonance circuit is compared with a structure where the receiver coil included in the single resonance circuit is divided into a plurality of partial coils to form a plurality of resonance circuits each including a corresponding one of the partial coils, in order to make the resonance frequency invariant, the capacitance of the resonance capacitor of each resonance circuit including the partial coil is larger than the capacitance of the resonance capacitor of the original single resonance circuit. For example, as in the above-described embodiment, when the power receiver device 3 includes three resonance circuits, and their respective receiver coils have the same number of turns, the inductance of the receiver coil of each resonance circuit is one ninth of the inductance of the receiver coil of the original single resonance circuit. Therefore, in order to obtain the same output voltage as the output voltage in the structure where the single resonance circuit is provided, the capacitance of the resonance capacitor of each resonance circuit including the partial coil becomes larger than the capacitance of the resonance capacitor of the original single resonance circuit, and the equation (2) shows that the voltage Vpp across the terminals of the resonance capacitor becomes lower.

A description will be given below of an example of calculation of the voltage across both the terminals of the resonance capacitor of the resonance circuit for the power receiver device including a single resonance circuit, which is a comparative example, and the power receiver device 3 according to the embodiment. Note that it is assumed that the power receiver device 3 includes three resonance circuits.

In the comparative example, it is assumed that a voltage Vin of AC power applied to the transmitter coil 12 is 270 V, a frequency f of the AC power is 85 kHz, inductance L1 of the transmitter coil 12 is 216 μH, and capacitance of the capacitor 13 is 1.7 μF. It is further assumed that inductance L2 of the receiver coil of the resonance circuit of the power receiver device is 216 μH, capacitance Cs of the resonance capacitor connected in series to the receiver coil is 16.5 nF, a degree of coupling k between the transmitter coil and the receiver coil is 0.15, a resistance value Rl of the resonance circuit made up of the transmitter coil 12 and the capacitor 13 of the power transmitter device is 0.12Ω, a resistance value Ro of the resonance circuit of the power receiver device is 0.04Ω, a resistance value of the load circuit is 6.5Ω, and a voltage Vo output to the load circuit is 40 V. In this case, the voltage Vpp across the terminals of the resonance capacitor becomes equal to 1780 V according to the equation (2). On the other hand, it is assumed that three coils that result from equally dividing the receiver coil of the comparative example are the receiver coils 22-1 to 22-3 included in the resonance circuits 21-1 to 21-3 of the power receiver device 3 of the embodiment. Then, the inductance L2 of the receiver coil of each resonance circuit of the power receiver device 3 is set to 24 μH, and the capacitance of the variable capacitance circuit is set to 56 nF, so that the resonance circuits of the power receiver device 3 resonate at the same frequency, and the output voltage Vo is equal to the output voltage of the comparative example. When it is assumed that the degree of coupling between the receiver coils of the resonance circuits of the power receiver device is 0.83, and the other parameter values are the same as the parameter values of the above-described comparative example, the voltage Vpp across the terminals of the variable capacitance circuit becomes equal to 593.3 V according to the equation (2). As described above, in the non-contact power feeding device according to the embodiment, the voltage across the terminals of the variable capacitance circuit of the resonance circuit becomes lower.

As described above, the power receiver device of the non-contact power feeding device includes the plurality of resonance circuits that can resonate with the current flowing through the transmitter coil of the power transmitter device, and each of the resonance circuits includes the receiver coil and the variable capacitance circuit that is adjustable in capacitance. The receiver coils of the resonance circuits are arranged so as to be electromagnetically coupled to each other. This allows the non-contact power feeding device to make the inductance of the receiver coil of each resonance circuit low as compared with the structure where the power receiver device includes a single resonance circuit, so that the capacitance of the variable capacitance circuit of each resonance circuit can be made larger to make the voltage across the terminals of the variable capacitance circuit lower. Further, in the non-contact power feeding device, since the receiver coils included in the plurality of resonance circuits are arranged so as to be electromagnetically coupled to each other, which allows one of the plurality of resonance circuit to take power received by each of the resonance circuits. Furthermore, the power receiver device is capable of adjusting the capacitance of the variable capacitance circuit of each resonance circuit in accordance with the output voltage to suppress a decrease in power transmission efficiency even when the degree of coupling between the transmitter coil and the receiver coil of each resonance circuit dynamically changes.

According to a modification, among the resonance circuits 21-1 to 21-n included in the power receiver device 3, in the resonance circuit 21-1 from which the output voltage is taken via the rectifying and smoothing circuit 24, the receiver coil 22-1 and the resonance capacitor may be connected in series.

Figure 4:
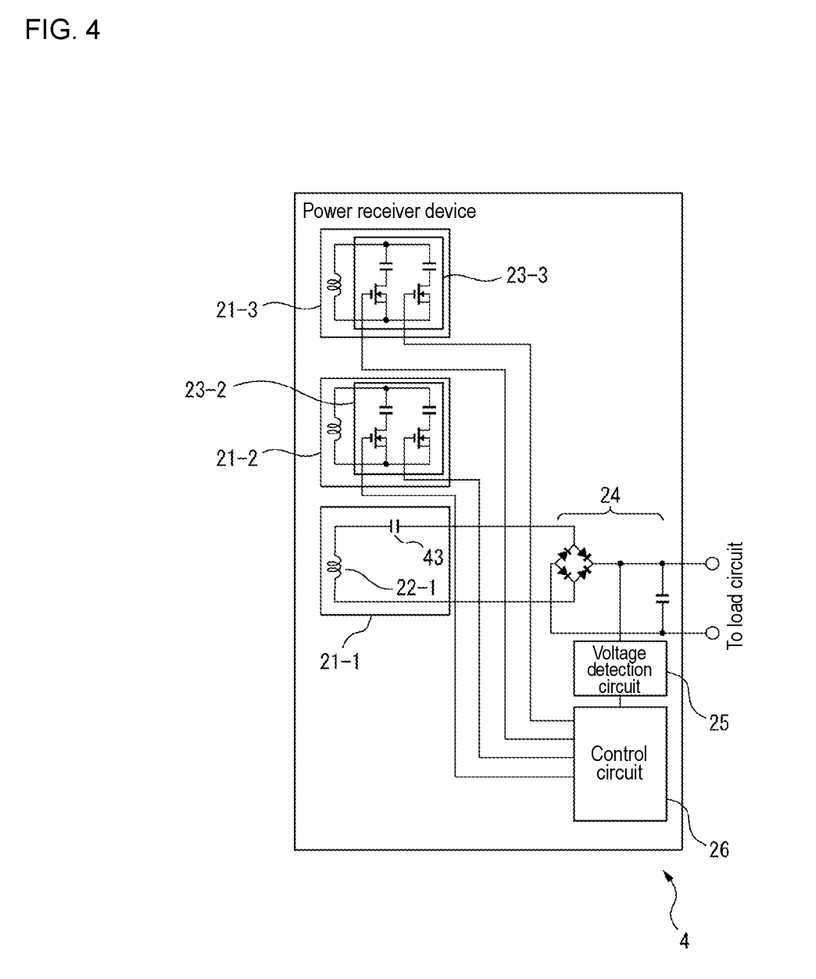
FIG. 4 is a schematic structure diagram illustrating a power receiver device according to a modification.

FIG. 4 is a schematic structure diagram of a power receiver device according to the modification. A power receiver device 4 according to the modification includes n resonance circuits 21-1 to 21-n (where n is an integer greater than or equal to 2, and in the example shown in FIG. 4, n is equal to 3), a rectifying and smoothing circuit 24, a voltage detection circuit 25, and a control circuit 26. The power receiver device 4 is different from the power receiver device 3 shown in FIG. 1 in structure of the resonance circuit 21-1 from which the output voltage is taken via the rectifying and smoothing circuit 24. Thus, a description will be given below of the resonance circuit 21-1 and components related to the resonance circuit 21-1.

According to the modification, the resonance circuit 21-1 includes a receiver coil 22-1 and a resonance capacitor 43 connected in series to the receiver coil 22-1 between the receiver coil 22-1 and the rectifying and smoothing circuit 24. This causes the power receiver device 4 to act as the NS type. Note that, according to the modification, as in the above-described embodiment, the control circuit 26 only needs to regulate the capacitance of each of the variable capacitance circuits 23-2 to 23-$n$ of the resonance circuits 21-2 to 21-$n$ based on the output voltage from the resonance circuit 21-1 detected by the voltage detection circuit 25. This also allows the power receiver device according to the modification to lower the voltage across the terminals of the variable capacitance circuit included in each of the resonance circuits 21-2 to 21-$n$ and to suppress a decrease in energy transmission efficiency even when the degree of coupling between the transmitter coil and the receiver coil of each resonance circuit dynamically changes.

According to another modification, the power receiver device may further include a load coil provided so as to be electromagnetically coupled to each of the receiver coils of the plurality of resonance circuits, and power received via the load coil may be output to the load circuit.

Figure 5:
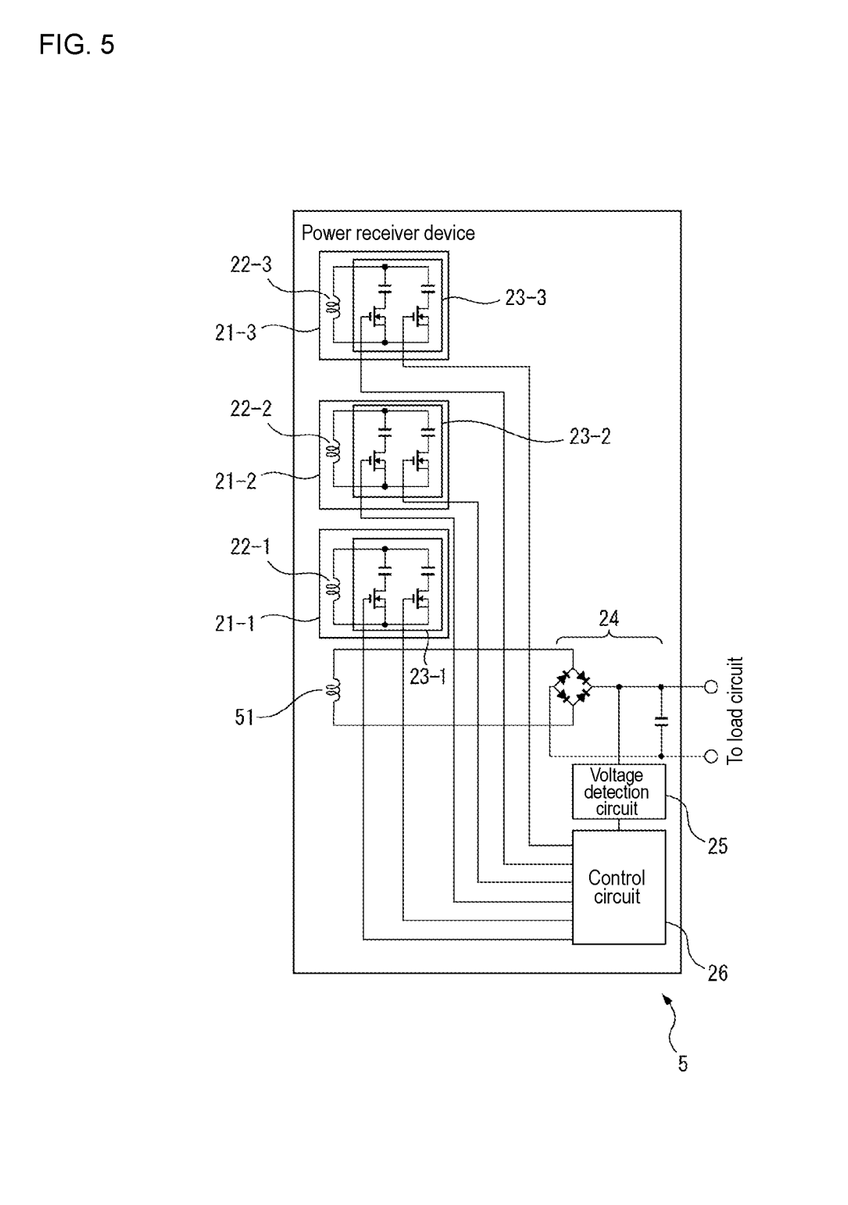
FIG. 5 is a schematic structure diagram illustrating a power receiver device according to another modification.

FIG. 5 is a schematic structure diagram of a power receiver device according to the modification. A power receiver device 5 according to the modification includes n resonance circuits 21-1 to 21-$n$ (where n is an integer greater than or equal to 2, and in the example shown in FIG. 5, n is equal to 3), a load coil 51, a rectifying and smoothing circuit 24, a voltage detection circuit 25, and a control circuit 26. The power receiver device 5 is different from the power receiver device 3 shown in FIG. 1 in that the output voltage is taken from the load coil 51 via the rectifying and smoothing circuit 24. Thus, a description will be given below of the load coil 51 and components related to the load coil 51.

According to the modification, the load coil 51 is disposed so as to be electromagnetically coupled to each of the receiver coils 22-1 to 22-$n$ of the resonance circuits 21-1 to 21-$n$. The load coil 51 has both ends connected to the rectifying and smoothing circuit 24. This causes power received from the power transmitter device 2 by each of the resonance circuits 21-1 to 21-$n$ to be output from the load coil 51 to the load circuit via rectifying and smoothing circuit 24. Note that, according to the modification, as in the above-described embodiment, the control circuit 26 only needs to regulate the capacitance of each of the variable capacitance circuits 23-1 to 23-$n$ of the resonance circuits 21-1 to 21-$n$ based on the output voltage from the load coil 51 detected by the voltage detection circuit 25. This also allows the power receiver device according to the modification to lower the voltage across the terminals of the variable capacitance circuit included in each resonance circuit and to suppress a decrease in energy transmission efficiency even when the degree of coupling between the transmitter coil and the receiver coil of each resonance circuit dynamically changes.

Note that, according to the modification, the load coil 51 may be wound around a single core together which the receiver coils 22-1 to 22-$n$ of the resonance circuits 21-1 to 21-$n$. For example, the load coil 51 may be wound around the magnetic core 30$a$ of the core 30 shown in FIGS. 2A and 3A together with the receiver coil of each resonance circuit. At this time, the receiver coil of each resonance circuit may be wound concentrically around the magnetic core, while the load coil 51 may be wound around the magnetic core 30$a$ so as to be located remote from the transmitter coil relative to the receiver coil of each resonance circuit when the power transmitter device 2 and the power receiver device 5 are arranged to enable power transmission. That is, in FIG. 3A, the load coil 51 may be wound around the magnetic core 30$a$ on an upper side of each receiver coil so as to be remote from the transmitter coil relative to each receiver coil. This prevents the degree of coupling between each receiver coil and the transmitter coil from decreasing due to the presence of the load coil 51.

Furthermore, in the above-described embodiment or modifications, the power receiver device may include at least one resonance circuit (hereinafter, referred to as a fixed resonance circuit for the sake of convenience) having no variable capacitance circuit. The fixed resonance circuit includes a receiver coil and a resonance capacitor that is connected to the receiver coil and resonates with a current flowing through a transmitter coil together with the receiver coil. Likewise, the receiver coil of the fixed resonance circuit only needs to be disposed so as to be electromagnetically coupled to the receiver coils of the other resonance circuits. For example, the receiver coil of the fixed resonance circuit may also be wound around a single core together with the receiver coils of the other resonance circuits.

This allows the number of resonance circuits included in the power receiver device to increase so as to make the inductance of the receiver coil of each resonance circuit smaller, thereby allowing the power receiver device to make the voltage across the terminals of the variable capacitance circuit or the resonance capacitor lower. Furthermore, according to the modification, the inductance of the receiver coil of the fixed resonance circuit may be larger than the inductance of the receiver coil of another resonance circuit having a variable capacitance circuit. This allows the power receiver device to make the voltage across the terminals of the variable capacitance circuit lower than the voltage across the terminals of the resonance capacitor of the fixed resonance circuit, thereby allowing a decrease in the withstand voltage required for the switching element of the variable capacitance to be lower.

As described above, those skilled in the art may make various modifications according to the embodiment within the scope of the present invention.

DESCRIPTION OF SYMBOLS 1 non-contact power feeding device
2 power transmitter device
11 power supply circuit
12 transmitter coil
13 capacitor
3 to 5 power receiver device
21-1 to 21-$n$ resonance circuit
22-1 to 22-$n$ receiver coil
23-1 to 23-$n$ variable capacitance circuit
31-1-1 to 31-$n$-1, 31-1-2 to 31-$n$-2 resonance capacitor
32-1-1 to 32-$n$-1, 32-1-2 to 32-$n$-2 switching element
24 rectifying and smoothing circuit
25 voltage detection circuit 26 control circuit
30 core
43 resonance capacitor
51 load coil

The invention claimed is:

1. A non-contact power feeding device comprising:
a power transmitter device; and
a power receiver device to which the power transmitter device transmits power in a non-contact manner, wherein
the power transmitter device comprises
   a transmitter coil configured to supply power to the power receiver device, and
   a power supply circuit configured to supply AC power to the transmitter coil,
the power receiver device comprises
   a plurality of resonance circuits each comprising a receiver coil configured to receive power from the transmitter coil of the power transmitter device,
   a voltage detection circuit configured to detect an output voltage from the plurality of resonance circuits,
   a load coil disposed so as to be electromagnetically coupled to each of the receiver coils of the plurality of resonance circuits and configured to output power received from the power transmitter device by each of the plurality of resonance circuits, and
   a control circuit,
the receiver coils of the plurality of resonance circuits are arranged so as to be electromagnetically coupled to each other,
at least one of the plurality of resonance circuits comprises a variable capacitance circuit that is connected to the receiver coil of the at least one of the plurality of resonance circuits and is regulatable in capacitance, the at least one of the plurality of resonance circuits being configured to resonate at a frequency determined based on inductance of the receiver coil of the at least one of the plurality of resonance circuits, capacitance of the variable capacitance circuit, and capacitance of another resonance circuit among the plurality of resonance circuits, and
the control circuit is configured to regulate the capacitance of the variable capacitance circuit of the at least one of the plurality of resonance circuits in accordance with the output voltage, and wherein
the receiver coils of the plurality of resonance circuits are wound around a single core and are arranged along a radial direction centered on the core, and
the load coil is wound around the core so as to be located remote from the transmitter coil relative to each of the receiver coils of the plurality of resonance circuits when the power transmitter device and the power receiver device are arranged to enable power transmission.

2. The non-contact power feeding device according to claim 1, wherein
the receiver coil of the at least one of the plurality of resonance circuits comprising the variable capacitance circuit is smaller in inductance than the receiver coil of any of the plurality of resonance circuits comprising no variable capacitance circuit.

* * * * *